United States Patent

[11] 3,613,014

[72] Inventor Gerhard D. Moegen
Munich, Germany

[21] Appl. No. 857,071
[22] Filed Sept. 11, 1969
[45] Patented Oct. 12, 1971
[73] Assignee Messerschmitt-Bolkow-Blohm Gesellschaft mit beschrankter Haftung
Munich, Germany
[32] Priority Sept. 19, 1968
[33] Germany
[31] P 17 62 905.9

[54] CHECK CIRCUIT FOR RING COUNTER

6 Claims, 2 Drawing Figs.

[52] U.S. Cl. .......... 328/43, 307/218, 307/223 R, 340/146.1
[51] Int. Cl. .......... H03k 21/30, H03k 23/02
[50] Field of Search .......... 307/223, 218; 328/43, 48; 340/146.1

[56] References Cited

UNITED STATES PATENTS

| | | | |
|---|---|---|---|
| 3,051,855 | 8/1962 | Lee | 307/223 X |
| 3,163,847 | 12/1964 | O'Connor, Jr. | 340/146.1 |
| 3,215,938 | 11/1965 | Spencer et al. | 328/43 |
| 3,217,185 | 11/1965 | Jansons | 307/223 |

OTHER REFERENCES

Pub. I. " Ring Counter and Error Correction" by Gerrand in IBM Tech. Disclosure Bulletin, Vol. 10, No. 10, March 1968, pages 1565- 1566. (328-43)

*Primary Examiner*—Stanley D. Miller, Jr.
*Attorneys*—William D. Hall, Elliott I. Pollock, Fred C. Philpitt, George Vande Sande, Charles F. Steininger and Robert R. Priddy

ABSTRACT: A check circuit for a ring counter of the electronic type. The check circuit continually monitors the ring counter and determines when an abnormal condition occurs, i.e., when more than one stage of the counter is in a "1" condition and also when no stages of the counter are in the "1" condition. A separate subcircuit is provided for each half of the ring counter and each such subcircuit determines whether at least one of the stages in the respective half of the counter is in the "1" condition. Since one, and only one, of the stages should at any time be in its "1" condition, the normal condition then is for only one of the subcircuits to be responsive to its respective group of counter stages. When both of the subcircuits, or none, is providing an output, this is an indication of abnormal operation, and a distinctive output signal is provided.

PATENTED OCT 12 1971 3,613,014

INVENTOR.
Gerhard Moegen

BY Hall, Pollock & Vande Sande

ATTORNEYS

CHECK CIRCUIT FOR RING COUNTER

BACKGROUND OF THE INVENTION

The invention relates to a check circuit for a ring counter having a plurality of stages which are interconnected, and with the counter initially set in a condition where one, and only one, stage thereof is operated to an abnormal state called its "1" state. In response to an input of successive pulses which are applied to all the stages of the counter, the "1" state of the first stage is transferred, stage by stage, in sequence around the counter, each stage when in its "1" state providing one or more enabling inputs to the next stage in turn.

One of the problems involved in the use and operation of ring counters is the possibility that more than one stage of the counter will at some time be operated to its "1" state. This may occur as the result of the improper operation of a circuit component, or by reason of the inadvertent generation of a stray pulse in the counter or in related equipment. When this happens, it is of course quite important that the condition be promptly recognized and corrected since otherwise unreliable information is given continually by the ring counter. Another problem is that a circuit failure, perhaps of a momentary nature, may cause the one state of the counter then in its "1" state to be inadvertently operated to its "0" state, with the result that all the stages of the counter are then in the "0" state and no further transferral operation through the counter stages can then take place.

Various circuit organizations have been developed to cope with the above-stated problem. For the most part, these circuit organizations are quite complex, requiring a considerable number of gating inputs as compared to what is required by the present invention. Thus, in one known monitoring circuit, for a counter of $n$ stages, the number of gate inputs required is $n^2+n$. In contrast, the monitoring circuit of this invention requires only a number of inputs equal to $n+4$. Also, the monitoring circuit of this invention readily permits the giving of a special alarm signal which may be a visual or audible signal to indicate a circuit fault.

BRIEF DESCRIPTION OF THE DRAWINGS

In describing the invention, reference will be made to the accompanying drawings in which.

DESCRIPTION OF THE PREFERRED EMBODIMENT

Figure 1:
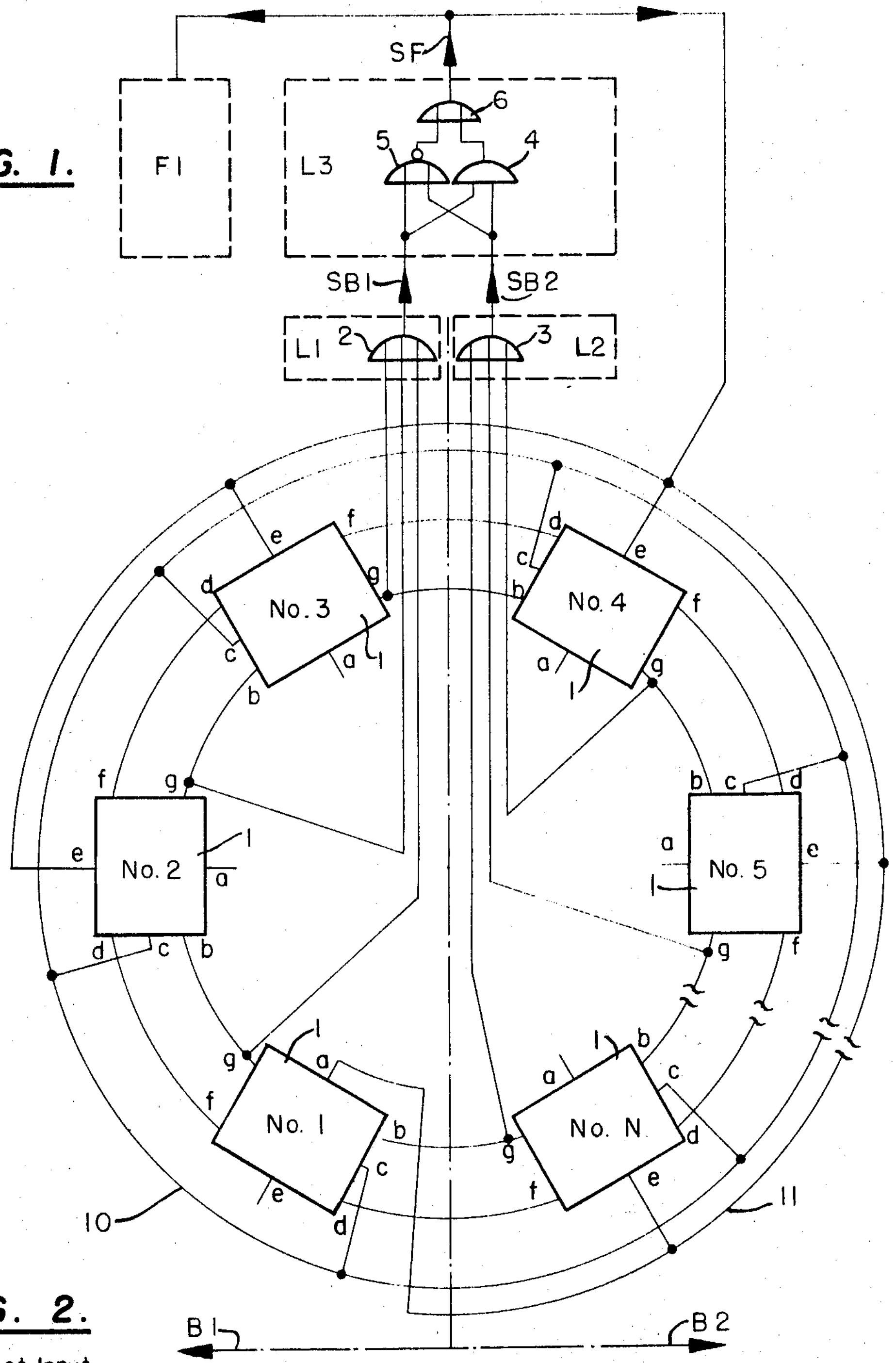
FIG. 1 is a partially diagrammatic view of a ring counter incorporating therein the monitoring circuit of the present invention.

FIG. 1 illustrates a ring counter employing a plurality of Eccles-Jordan flip-flop stages, comprising $n$ in number and each having a plurality of input and output terminals. The functions of the various terminals are as shown diagrammatically in FIG. 2.

Each stage is bistable in operation, with its so-called normal state being designated as its "0" condition, and its abnormal state as the "1" condition, and the stage remains in the state to which it was last operated until it receives a further triggering input. The successive stages are so interconnected that any one stage, when in its "1" condition, provides one or more enabling gate voltages to the next stage in sequence so that only such next stage will be operated to its "1" condition upon the receipt of a further drive pulse, which pulse also has the effect of restoring the previously operated stage back to its "0" condition. As a consequence, each stage of the counter in turn is operated to its "1" state as successive drive pulses are applied until a complete cycle of operation has been gone through, at which time the cycle starts all over again repetitively. From the foregoing, it can be seen that the operation of the counter is characterized by the fact that one, and only one, stage of the counter is to be at any time in its "1" state while all other stages are to be in their "0" states. The circuit organization of this invention is provided to continually monitor the ring counter and to provide a distinctive output signal from the foregoing conditions are not met.

Figure 2:
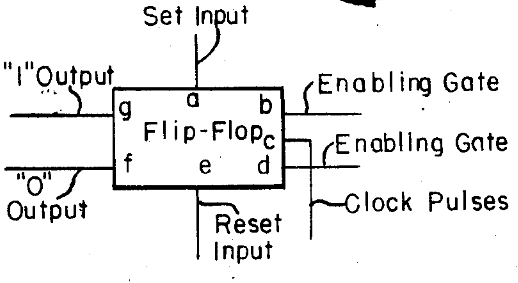
FIG. 2 is a diagrammatic view of a single stage of the counter of FIG. 1, illustrating the function of the various input and output terminals.

Referring to FIG. 2, it will be noted that the input on terminal *a* is a set input, and that the input on terminal *e* is a reset input. The function of the set input is to forcibly operate the stage to its "1" condition while the function of the reset input is to forcibly operate the stage to its "0" condition irrespective of whether or not the stage is at that time receiving an enabling gating voltage from the immediately adjacent stage. Since it may not be determined whether a stage is in its "0" or in its "1" state when first placed into operation; ordinarily, the set input is applied to the first stage and the reset input is applied to the remainder of the stages for the purpose of ensuring that the counter is initially set in a condition where one, and only one, stage thereof is in its "1" state. The set input and the reset input ordinarily are applied only before counting operation.

The outputs on terminals *f* and *g* are the respective "0" and "1" outputs of the counter stage. Thus, the counter stage may be so organized that it provides a distinctive signal on its "0" output terminal *f* whenever the stage is in its "0" condition, and such that it provides a distinctive output voltage on the terminal *g* whenever it is in its "1" condition.

The input terminals *b* and *d* are provided from the output terminals of an adjacent stage of the counter. Ordinarily, a stage can be operated in response to the application of an input clock pulse to its "1" condition only when a distinctive input signal is provided on the input terminal *b*, that means when the immediately adjacent stage is in its "1" condition; and it only can be operated to its "0" condition when a distinctive input signal is provided on the input terminal *d*, that means when the adjacent stage is in its "0" condition. Quite frequently, the counter is operated in response to a regularly recurring series of drive or clock pulses applied to input terminal *c*.

FIG. 1 illustrates that the various counters stages are divided into two groups, designated for convenience as groups B1 and B2. The purposes of such division are merely to provide that a sequentially connected group of the counter stages will be connected to a particular gating circuit L1, while the remainder of the stages are connected to a similar gating circuit L2. More specifically, it will be noted that the *g* output terminal of each of the stages provides an enabling gating signal to an enabling gate input *b* of the next higher numbered stage in order around the ring. Similarly, the *f* output terminal, which provides the "0" output of each stage, supplies an enabling gate input signal to the terminal *d* of the next higher numbered stage. The concurrent presence of the signal on the output terminal *g* and the lack of a signal on the output terminal *f* when any one stage is in its "1" state ensures that the next higher numbered stage is properly gated so that when it receives an input on its terminal *c* resulting from the application of a drive pulse on bus 10, such next stage will then be instantaneously operated from its "0" state to its "1" state at the same time that the previous stage is restored to its "0" state.

In order to properly condition the ring counter for operation when power is first applied to the system, a resetting pulse is applied to bus 11, and this resetting pulse is applied to the reset input *e* of each of the stages other than stage No. 1 while this same resetting pulse is simultaneously applied to the set input *a* of only stage No. 1. This resetting operation therefore ensures initially that stage No. 1 will be operated to its "1" condition whereas all the other stages in the ring counter are operated to their "0" condition.

The *g* output terminal of each of the stages of group B1 is connected to an OR gate 2 in the gating circuit L1, and each of the *g* output terminals of each of the remaining stages of the counter which are in group B2 is connected to an OR gate 3 in the gating circuit L2. The operation of each of these OR circuits is conventional, with each providing an output signal SB2, as the case may be, provided only that one or more of the plurality of inputs to the gate is present, i.e., that at least one of the associated stages of the group is in its "1" state. Similarly, the output SB2 of OR gate 3 is present when any one or more of the stages of group B2 is in its "1" state.

Assuming that the counter is operating normally, with only one stage of the counter in its "1" state, and all other stages in the "0" state, then there should be only one of the gating output signals SB1 and SB2 present; moreover, the presence of both of these gating signals, or neither of them, will then necessarily provide an indication of a circuit fault. Thus, if it is assumed that none of the stages of the counter, in either the B1 or B2 groups, is in the "1" state, then quite obviously neither of the gating signals SB1 nor SB2 will be present. As will be shown hereinafter, this condition is detected as a fault in operation of the counter by the additional gating circuit L3. On the other hand, assuming that two stages or more of the counter are at any time in the "1" state, and assuming further that one or more of these is in the B1 group and a different one on the B2 group, then it is evident that the signals SB1 and SB2 will both appear and, as will also be shown subsequently, this condition too will result in an output from gating circuit L3.

On the other hand, if the condition of more than a single "1" in the counter is evidenced by having two or more stages of the same group (B1 or B2) in the "1" state, but with no stages of the other group in "1" state, then initially at least, only one of the gating signals SB1 and SB2 will again be provided. For example, assume that an abnormal condition exists wherein both stages Nos. 4 and 5 of the counter are in the "1" state but all other stages are in the "0" state. Initially, this condition will result in the appearance of the output signal SB2 from OR circuit 3 but will not produce an output SB1 from the gating's OR circuit 2. However, as the counter steps through a few succeeding steps, the condition must eventually occur where one of the "1's" in the counter must appear in the B1 group and the other in the B2 group. As soon as this happens, then both the SB1 and SB2 output gating signals will be provided to again indicate the abnormal operation of the counter. Thus, assuming that the counter is one of six steps so that *n* in the counter of FIG. 1 equals 6, it can be seen under the assumed conditions that two further counting steps will result finally in the final (No. 6) stage and also the No. 1 stage of the ring counter both being in the "1" state so that outputs are provided from both these stages to the respective OR gating circuits 2 and 3, with the result that both the gating signals SB1 and SB2 are present.

One manner in which the gating circuit L3 may be organized to provide an indication of fault in the ring counting circuit is illustrated in FIG. 1, but it will be apparent to one skilled in the art that other combinations of gating circuit elements may be employed for this purpose. However, in the circuit illustrated, an AND gate 4 is employed, together with an inverting OR gate 5, in combination with an additional OR gate 6.

Consideration will first be given to the two conditions indicative of circuit faults in the counter, and it will be shown that each of these two different conditions results in the generation of the fault signal SF from OR gate 6. Thus, taking first the condition in which neither of the gating signals SB1 and SB2 is present, it will be apparent that the AND gate 4 will not receive any input and therefore will not provide any output signal. At the same time, the inverting OR gate 5, not receiving any input as well, will produce an output. Under these circumstances, the OR gate 6 receives one of its two inputs and thus produces the output signal SF, indicative of a circuit fault.

Taking now the condition where both the signals SB1 and SB2 are present, this will of course result in an output from the AND gate 4. In addition, the inverting OR gate 5, now receiving at least one input, will not produce an output, and thus again the OR gate 6 will receive one input on its two output terminals and will thus once again produce the output alarm signal SF.

Considering now one of the normal conditions, i.e., the condition wherein the signal SB1 is present and the signal SB2 is not present, this situation will necessarily result in no output from the AND gate 4. Also, the inverting OR gate 5, now receiving one input on its two input terminals, will produce no input. Therefore, the OR gate 6 receives no input and no alarm signal SF is provided. Exactly the same result occurs when the signal SB1 is not produced but the signal SB2 is produced.

The alarm signal SF may be used in either or both of two ways. Thus, it may be used to provide an input to a visual or audible alarm apparatus F1 which will then provide a distinctive signal indicative of improper ring counter operation. In addition, or alternatively, the signal SF may be used to provide a pulse on buss 11 which will be applied to the *e* input terminal of each of the counter stages other than the No. 1 stage, thereby producing a resetting operation of each stage, while at the same time applying an input to the *a* input of the No. 1 stage to set it to the "1" state, thereby effectively forcing the counter into proper operating conditions wherein one, and only one, stage of the counter is in its number one state.

What I claim is:

1. A check circuit for an electronic ring counter of the type comprising a plurality of interconnected bistable state stages in which normally only a single stage is in a second of its two states and all other stages are in the first of said two states, said check circuit comprising in combination, first circuit means electrically coupled to a first group of sequentially operated ones of said stages and providing a distinctive signal whenever at least one of the stages in said first group is in its second state, second circuit means electrically coupled to a second group of sequentially operated ones of said stages comprising all the stages of said counter other than those in said first group and providing a distinctive signal whenever at least one of the stages of said second group is in its second state, and output means for providing a manifestation indicative of a fault in said ring counter when neither or both of said first and second circuit means is concurrently providing its distinctive signal.

2. The check circuit of claim 1 in which each group includes at least one stage.

3. The ring counter of claim 2 in which each group of stages includes at least approximately one-half of the number of stages of the counter.

4. The ring counter of claim 1 in which each said first and second circuit means comprises an OR gate.

5. The check circuit of claim 1 in which said output means comprises both an AND and an inverted OR gate each having both said distinctive signals of the respective first and second circuit means applied thereto, said output means further including an OR gate coupled to the output of both said AND gate and said inverted OR gate so as to provide said distinctive manifestation whenever either of said AND and inverted OR gates provides an output.

6. The check circuit of claim 1 in which said output means includes means for providing a resetting pulse to each stage but one of said ring counter to operate each said stage to its first state and further providing said resetting pulse as a set input to said one stage to operate it to its second state.